United States Patent Office 2,727,293
Patented Dec. 20, 1955

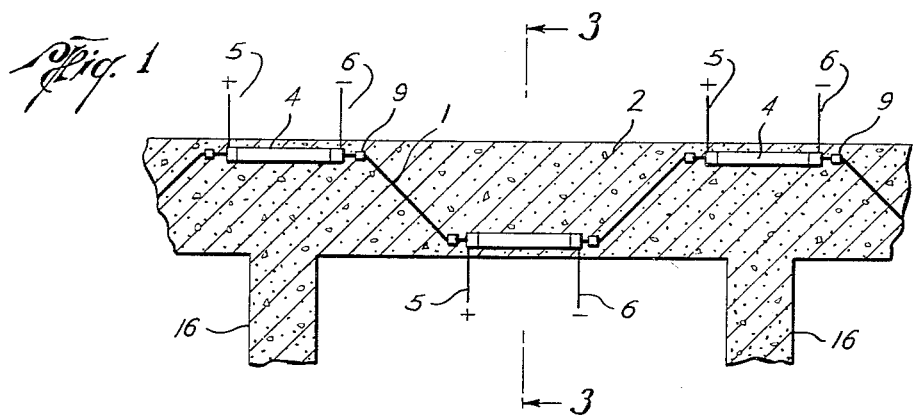
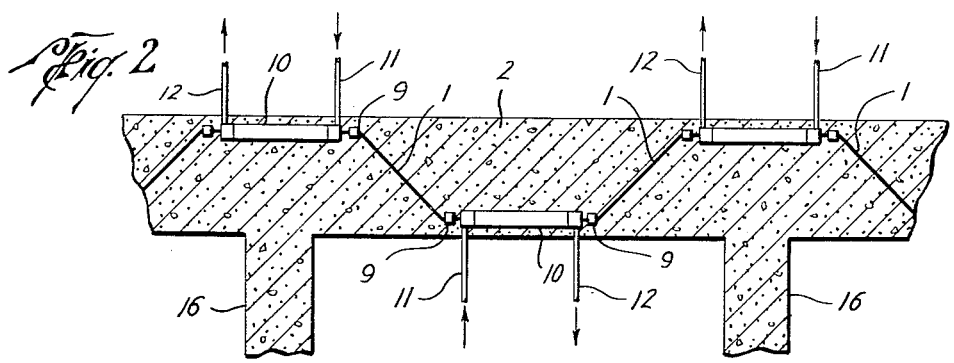
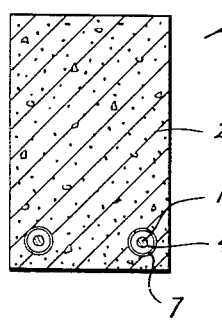
Frederick W. Barnett
Maurice N. Sumner
John E. Cashman
INVENTORS

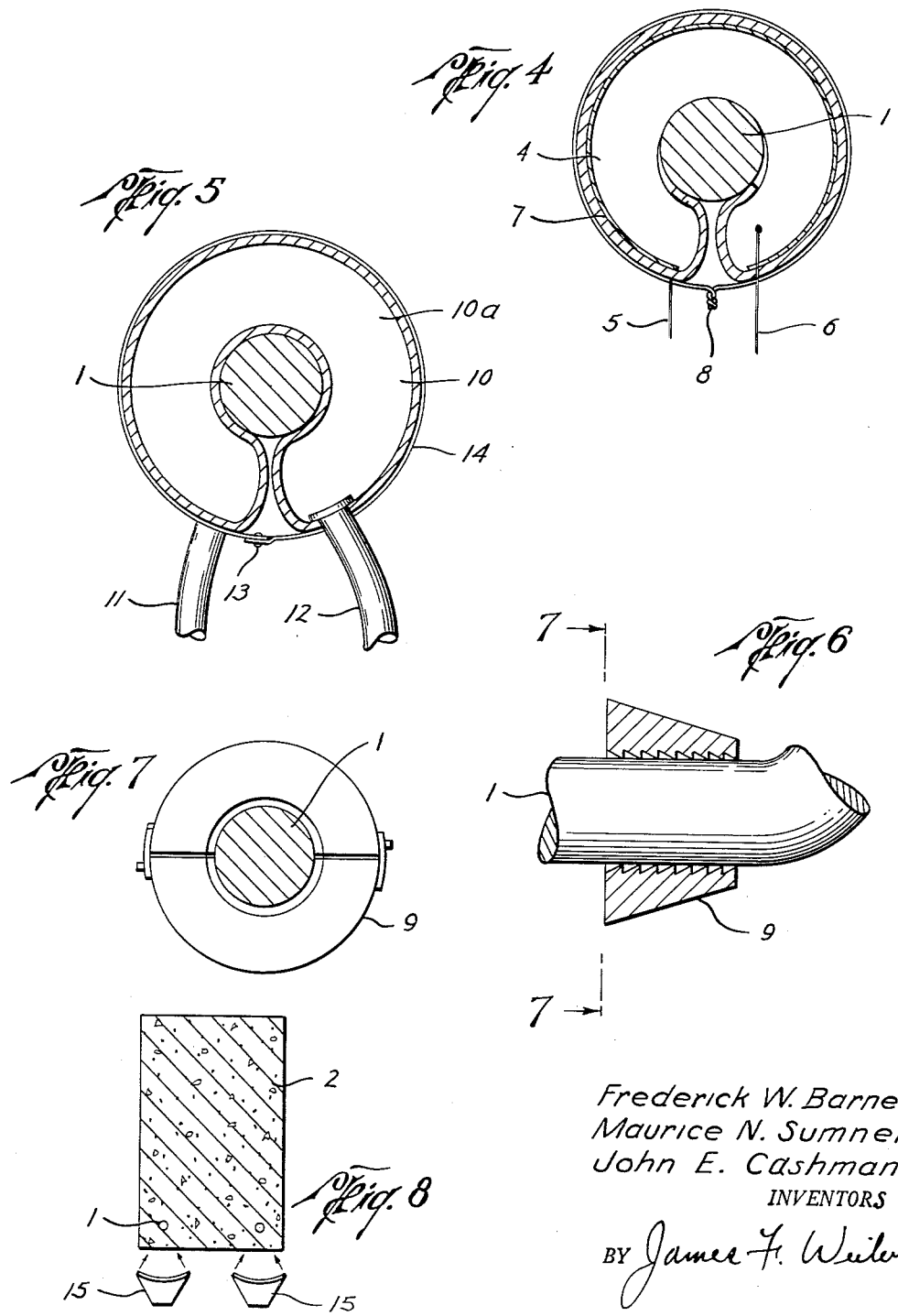

2,727,293

METHOD OF AND APPARATUS FOR PRODUCING PRESTRESSED REINFORCED HARDENED PLASTIC BODIES

Frederick W. Barnett, Maurice N. Sumner, and John E. Cashman, Houston, Tex., assignors of thirty-eight and two-thirds per cent to said Barnett, eight per cent to said Sumner, twenty-three and one-third per cent to said Cashman, fifteen per cent to Latimer Murfee, Harris County, and fifteen per cent to Fulbright, Crooker, Freeman & Bates, Houston, Tex., a law partnership Application October 16, 1952, Serial No. 315,176

19 Claims. (Cl. 25—118)

This invention relates to a method of and apparatus for producing prestressed reinforced hardened plastic bodies.

Hardened plastic bodies which are "prestressed" have many advantages over such bodies which are not stressed. For example, many hardened plastic bodies, of which concrete is a notable example, have excellent resistance to compressive stresses but low resistance to sheering and tensile stresses. The industries using structures comprising members made of hardened plastic bodies have found, among other advantages, that by "prestressing" structural members made of hardened plastic bodies the resistance to sheering and tensile stresses can be greatly increased. At present, a widely known and used means of prestressing such bodies is to allow the fluid plastic to harden around reinforcing members which are slightly stretched under a high tensile stress and then to secure the stretched reinforcing members to the plastic after it has hardened, thus transmitting the contracting force of the reinforcing members to the hardened plastic body. Another manner is to longitudinally expand the reinforcing members by a flow of electric current through them in such an amount that the members are heated and thermally expanded and then to secure them in their expanded condition to the hardened plastic body thereby transmitting the contracting force to the body. Such a method is proposed in U. S. Patent No. 2,319,105 of K. P. Billner, issued May 11, 1943.

Prestressing of plastic bodies has been known for some time, but has not found widespread commercial use due to the expense and hazards attendant some of the methods for pre- or post-tensioning. For example, the methods by physically stretching the reinforcing members while allowing the plastic material to harden requires installations of considerable size and expensive equipment in addition to the difficulty encountered in regulating the size of the contracting forces which are ultimately imposed upon the hardened bodies. The method of thermal expansion by heating the reinforcing or other members by a flow of current through them requires an enormous amount of current and, accordingly, is extremely expensive and dangerous. For example, it is extremely dangerous to pour or work around concrete when using high voltages.

Additionally, in either of these methods, the ends of the reinforcing members must be exposed in order that they may be secured to the hardened plastic upon release of the means causing their longitudinal expansion or stretching. This often necessitates the additional step of an application of a covering coat of the plastic material to conceal the exposed ends. Because of the stresses to which a particular body is to be subjected, quite often it is desired that only certain selected internal portions of the hardened plastic body be prestressed and this cannot be done where electric current is supplied to reenforcing or other members generally or ends of such members are stressed. Also, in either of these methods it is difficult if not impossible to have a stressed monolithic or continuous column and beam structure.

Accordingly, it is an object of this invention to provide a method of and an apparatus for selectively prestressing all or any portion of hardened plastic bodies that is flexible, relatively inexpensive and is not hazardous to workmen, operators and the like.

Additionally, it is an object of this invention to provide a method and apparatus to eliminate the necessity of the expensive installations and equipment now required for the present means and methods of mechanical and electrical prestressing. A further object of this invention is to eliminate the use of dangerously high voltages and yet longitudinally expand the reinforcing members thermally before they are secured or bonded to the hardened plastic bodies.

Yet another object of this invention is to permit the pouring of plastic bodies to take place in atmospheres below freezing temperatures by maintaining the temperature of the hardening mass at a temperature above that which will cause damage to it.

In the past prestressing of hardened plastic bodies has been done to increase their resistance to sheering and tensile stresses by imparting the contracting force of embedded reinforcing members to the hardened plastic body. We have found that plastic hardened bodies to be used as compression members may have their resistance to compressive stresses increased and their tendency to crumble under such stresses reduced by having the reinforcing members contracted while the plastic body is hardening in order to adjust the differences in the initial elasticity of various materials.

Accordingly, it is an object of this invention to provide a method of and an apparatus for prestressing hardened plastic bodies by contracting the embedded reinforcing or other members during the hardening of the plastic and then to transmit the expanding force of these members to the hardened plastic.

Other objects and features of the present invention will be apparent from the following description of an example of the invention, given for the purpose of disclosure, taken in connection with the accompanying drawing, in which like character references designate like or corresponding parts throughout the several views, and in which Fig. 1 is a sectional elevation of an apparatus constructed according to the invention utilizing an electric heating element as a means for selectively heating reinforcing members, Fig. 2 is a sectional elevation of an apparatus constructed according to the invention utilizing heat exchangers for selectively heating or cooling reinforcing members, Fig. 3 is a sectional view taken along the line 3—3 of Fig. 1, Fig. 4 is an enlarged view in cross section illustrating a portion of the apparatus illustrated in Fig. 1, Fig. 5 is an enlarged view in cross section illustrating a portion of the apparatus illustrated in Fig. 2, Fig. 6 illustrates a slip means for securing the expanded or contracted reinforcing members to the hardened plastic product, Fig. 7 is a sectional view along line 7—7 of Fig. 6, and Fig. 8 is a cross section view of a body to be prestressed, diagrammatically illustrating apparatus of the invention in which electronic radiators are used to selectively heat reinforcing members.

Broadly the method of the invention comprises selectively thermally expanding or contracting reinforcing or other members while the plastic is hardening about such members and releasing the expansion or contraction when the plastic is hardened. This may be accomplished by providing heat exchangers and electrical resistance heating elements disposed about such members or may be provided by penetrative heating of such members such as by electronic penetrative heating elements. Also, if desired, such selective heating may be accomplished chemically.

The invention is particularly adapted for use with concrete reinforced with iron, steel and the like, but other metals, such as aluminum, and the like may be used to reinforce and/or stress the concrete and other plastic materials may be stressed by the invention.

Referring now to the drawings, and particularly to Fig. 1, the reference numeral 1 refers to a reinforcing or other member imbedded in a plastic body 2, such as concrete. As indicated, the apparatus and method of the invention is operable with any conventional type of reinforcing or other members, such as rods, cables, beams, and the like and the body to be prestressed can be any material which is originally fluid, plastic or semi-plastic, when placed around the reinforcing members and then becomes hard.

The numeral 4 generally indicates an electric heating element or resistor, best shown in Fig. 4, for selectively heating a portion or portions of reinforcing or other members 1. The electric heating element 4 may be constructed from any well known and economical electric heating element formed in strips of sufficient width for it to be placed around a desired reinforcing member. Such an element can be a strip of coiled resistant wire. The heating element 4 is covered with the protective wrapper or sheath 7, which may be constructed of any suitable material, which may be waterproof or treated so that it is waterproof, to protect it from being wetted and from losing heat. The electrical conductors 5 and 6 provide electric current to the electric heating element 4. To aid in wrapping or positioning the electric heating elements about the members 1, suitable clamps may be used, such as the wire 8. Thus, as electric current is supplied to the electric heating element 4, that portion of the member 4 surrounded by the heating element is heated and expanded. When the concrete 2 has hardened, the supply of electric currents may be stopped, the cooling of the members 1 placing them under tension. The heating elements may be constructed of inexpensive materials and low voltages, such as about 15 to 50 volts may be used. Other voltages, of course, may be used depending upon the conditions. If desired, two or more sets of conductors may be provided in the electrical heating elements or resistors as a safety factor in the event one set of conductors burn out in use.

Secured to reinforcing members 1 are the slips 9, as best illustrated in Fig. 7, which aid in securing the expanded or contracted members 1 to the hardened plastic product after the product has hardened. This is diagrammatically illustrated in Figs. 1 and 2.

Fig. 2 illustrates a modified form of the apparatus of the invention in which a heat exchanger 10 provides either heat or cooling to the reinforcing or other members by the flow of fluids, liquids or gases, such as steam, molten sulphur, refrigerants and the like. This heat exchanger is best seen in Fig. 5 which illustrates it in place around the member 1 to which it is securely held by a conventional clamp 13. The heat exchanger may be formed in a flexible strip or other conventional shape and may have the hollow body 10a through which refrigerants or heating fluids may be circulated by means of the inlet 11 and the outlet 12. Preferably the body 10a may be formed of some economical and disposable material, and may be a heavy paper or fabric treated to resist fluid for the required length of time. If preferred, a sheath or layer of insulating material 14 may be placed about the body 10a. Other than providing a flow of heating fluids or refrigerants, the use of this modification is similar to the electric heating method described above.

Another modification is shown in Fig. 8 where the member 1 is selectively heated by penetrative heating, sometimes referred to as radio heat, such as by electronic radiation means, indicated by the reference numeral 15. These heating elements 15 are conventional, and no description is deemed necessary. In operation, they are positioned externally of the plastic body, and may be used alone or in combination with the other heating elements. For example, if an electric resistor heating element burned out, these external heating elements may be used to provide the desired heat.

In operation, reinforcing or other members are placed as desired in molds and the portions of the reinforcing members to be expanded and those to be contracted during the hardening process are selected. An example of such structure is Fig. 1. That figure shows a beam of hardened plastic material with two compression members indicated by the numeral 16. If this beam and the compression members 16 are designed to carry a load pressing downward, it may be that it is desired that a portion of the lower part of this beam between the compression members and the upper portions of it over the compression members are to be prestressed by the contracting force of an expanded reinforcing member. The compression members 16, the upper portion of the beam between the compression members, and the lower portion of the beam over the compression members may require prestressing by the transmission of the expanding force of reinforcing members.

To accomplish this expansion of the reinforcing members and the consequent transmission of their contracting force to the hardened plastic body, those portions of the reinforced members desired to be expanded are selected and are enveloped in electric or fluid heating elements in the manner shown in Figs. 4 and 5. The slips 9 may then be placed on the reinforcing members at the places between which the contractive force is desired. Of course, if desired, the penetrative heating elements 15 (Fig. 8) may be selectively positioned for this purpose.

On those portions of the reinforcing members which are desired to be contracted during the hardening of the plastic body, heat exchanger 10 is placed around them as shown in Fig. 5 and slips 9 are also secured on the reinforcing members at the points between which the expanding force is desired to be transmitted to the hardened body.

When using the electric resistor heating elements, the electrical conductors 5 and 6 are connected to a source of electric current. Where heat exchangers 10 are used, the tubes 11 and 12 are connected to a source and drain for hot fluids or refrigerants, as desired, and the fluids or refrigerants are allowed to flow through the heat exchangers.

The selective heating or cooling of the members 1 may be commenced before or after the pouring of the plastic, but should be maintained while the plastic is hardening. The amount or intensity of heat or refrigerant necessary and the spacing of heating elements are variable factors which will be determined for the particular use and may vary widely.

When the mass has hardened, the various sources of heat and refrigeration are removed and the resultant tendencies of the reinforcing members to contract or expand are transmitted to the hardened article through contact between the reinforcing members and the hardened body by the use of slips 9 or some similar clamps, pins and the like where sufficient bond does not exist.

Thus, it is apparent that the invention is flexible and either selective thermal expansion or contraction or a combination thereof may be used.

It seems apparent that the present invention is one which fulfills the objects hereinabove set forth, and attains other advantages and features which are obvious and which are inherent in the method and apparatus.

The invention may be embodied in other forms and it is understood that the specific details and arrangement of parts are illustrative only for the purpose of disclosure and that the invention is to be limited only by the spirit and scope of the appended claims.

What is claimed is:

1. In the method of stressing a hardened plastic body having at least one reinforcing member embedded therein, the improvement comprising maintaining selected portions only of the reinforcing member at a temperature different from that of the plastic body as the body hardens and discontinuing the maintenance of said selected portions at a temperature different from that of the plastic body after the body has hardened and the reinforcing member has been bonded to the body.

2. In the method of stressing a hardened plastic body having at least one reinforcing member embedded therein, the improvement comprising maintaining selected portions only of the reinforcing member at a temperature higher than that of the plastic body as the body hardens and discontinuing the maintenance of said selected portions at said temperature higher than that of the plastic body after the body has hardened and the reinforcing member has been bonded thereto.

3. The method of claim 2 where at least one electric heating means is secured to such selected portions to maintain such selected portions at said temperature.

4. The invention of claim 2 where at least one fluid heat exchanger is secured to such selected portions to maintain such selected portions at said temperature.

5. The invention of claim 2 where at least one penetrative heating means is positioned exteriorly of the body to maintain such selected portions at said temperature.

6. In the method of prestressing a hardened plastic body having at least one reinforcing member in it, the improvement of maintaining selected portions of the reinforcing member at a temperature lower than that of the plastic body as the body hardens.

7. The invention of claim 6 where at least one fluid heat exchanger is secured to such selected portions and refrigerant is flowed through such heat exchanger to maintain such selected portions at said temperature.

8. The method of prestressing a hardened plastic body having at least one reinforcing element in it comprising, longitudinally expanding selected portions of the reinforcing element by maintaining those portions at a higher temperature than the plastic body as the plastic body hardens by the application of heat to such portions, maintaining such portions at such higher temperature until the plastic body hardens, and subsequently discontinuing the application of heat to such portions whereby the contraction of such portions is applied to such hardened plastic body.

9. The invention of claim 8 where the heat is selectively supplied to the reinforcing member by one or more electrical heating elements.

10. The invention of claim 8 where the heat is applied to the reinforcing member by one or more fluid heat exchangers.

11. The invention of claim 8 where the heat is applied to the reinforcing member by one or more penetrative heating means positioned externally of such body.

12. The method of prestressing a hardened plastic body having at least one reinforcing element in it comprising, longitudinally contracting selected portions of the reinforcing element by maintaining those portions at a lower temperature than the plastic body as the plastic body hardens by cooling such portions, continuing cooling such portions until the plastic body hardens, and subsequently discontinuing such cooling whereby expansion of such portions is applied to such hardened plastic body.

13. The invention of claim 12 where the selected portions are cooled by circulating refrigerant through fluid heat exchangers secured to such portions.

14. An apparatus for prestressing a hardened plastic body having at least one reinforcing member embedded in it comprising, a flexible body adapted to be secured about a portion of such member, heating means carried by said body, and means to provide heat to such heating means.

15. The invention of claim 14 where the heating means comprises an electric heating element and the means to provide heat to such heating means are electrical conductors adapted to be connected to a source of electric current.

16. The invention of claim 14 where the heating means comprises a fluid passage and the means to provide heat comprise conduits communicating with such fluid passage.

17. An apparatus for selectively prestressing a reenforcing member in a plastic body comprising, a flexible moistureproof body adapted to be wrapped about a portion of such member, means to secure such body to such portion, heating means disposed in such body, and means to provide heat to such heating means.

18. An apparatus for selectively prestressing a reinforcing member in a plastic body comprising, a flexible moistureproof body adapted to be wrapped about a portion of such member, a fluid passage in such body, and conduits communicating with such fluid passage for flowing heating fluid or refrigerant through such passage.

19. An apparatus for selectively prestressing a reinforcing member in a plastic body comprising, a flexible moistureproof body adapted to be wrapped about a portion of such member, a flexible electric heating element disposed in such body, and electric conductors connected to such heating element for supplying electric current to such heating element.

References Cited in the file of this patent

UNITED STATES PATENTS

| | | |
|---|---|---|
| 2,319,105 | Billner | May 11, 1943 |
| 2,413,990 | Muntz | Jan. 7, 1947 |